United States Patent
Topol et al.

(10) Patent No.: US 9,957,840 B2
(45) Date of Patent: May 1, 2018

(54) ACOUSTIC TREATMENT TO MITIGATE FAN NOISE

(71) Applicant: United Technologies Corporation, Hartford, CT (US)

(72) Inventors: David A. Topol, West Hartford, CT (US); Bruce L. Morin, Springfield, MA (US); Dilip Prasad, Newbury Park, CA (US); Thomas J. Ouellette, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 341 days.

(21) Appl. No.: 14/760,719

(22) PCT Filed: Feb. 19, 2014

(86) PCT No.: PCT/US2014/017016
§ 371 (c)(1),
(2) Date: Jul. 14, 2015

(87) PCT Pub. No.: WO2014/189572
PCT Pub. Date: Nov. 27, 2014

(65) Prior Publication Data
US 2015/0337684 A1    Nov. 26, 2015

Related U.S. Application Data

(60) Provisional application No. 61/769,233, filed on Feb. 26, 2013.

(51) Int. Cl.
*F01D 25/24* (2006.01)
*F01D 5/02* (2006.01)
(Continued)

(52) U.S. Cl.
CPC ............... *F01D 25/24* (2013.01); *F01D 1/02* (2013.01); *F01D 5/021* (2013.01); *F02C 7/045* (2013.01);
(Continued)

(58) Field of Classification Search
CPC .... F01D 11/125; F01D 11/127; F01D 21/045; F02C 7/045; F05D 2250/283; F05D 2260/96; F02K 1/827
See application file for complete search history.

(56) References Cited

U.S. PATENT DOCUMENTS 3,821,999 A * 7/1974 Guess ................. G10K 11/172
                                                        181/296
3,890,060 A   6/1975 Lipstein
(Continued)

FOREIGN PATENT DOCUMENTS

| EP | 0823547 | 2/1998 |
| EP | 1411225 A1 | 4/2004 |
| EP | 2251261 A2 | 11/2010 |

OTHER PUBLICATIONS

International Preliminary Report on Patentability for International Application No. PCT/US2014/017016 dated Sep. 11, 2015.
(Continued)

*Primary Examiner* — Kenneth Bomberg
*Assistant Examiner* — Hoon Choi
(74) *Attorney, Agent, or Firm* — Carlson, Gaskey & Olds, P.C.

(57) ABSTRACT

A gas turbine engine has a propulsor including a fan and a liner positioned upstream of the fan. The liner has a backing plate, a cellular structure with cells extending from the backing plate, and a perforated sheet with a depth defined as a distance between the perforated sheet and the backing sheet. The depth is selected to achieve a desired ratio of the
(Continued)

depth relative to a gap?. A depth to gap ratio is substantially in a range of 0.035 to 0.08. A method is also disclosed.

6 Claims, 3 Drawing Sheets

(51) Int. Cl.
    *F01D 1/02*     (2006.01)
    *F02C 7/045*     (2006.01)

(52) U.S. Cl.
    CPC .... *F05D 2220/32* (2013.01); *F05D 2250/283* (2013.01); *F05D 2260/96* (2013.01)

(56) References Cited

U.S. PATENT DOCUMENTS

| | | | |
|---|---|---|---|
| 4,122,672 A * | 10/1978 | Lowrie | F02C 7/045 181/222 |
| 4,786,231 A | 11/1988 | Kelley | |
| 5,478,205 A | 12/1995 | Chou et al. | |
| 5,537,861 A | 7/1996 | Seitelman et al. | |
| 5,934,611 A | 8/1999 | Tindell et al. | |
| 5,966,525 A | 10/1999 | Manzi, Jr. et al. | |
| 8,234,869 B2 * | 8/2012 | Tuan | B64D 33/02 181/213 |
| 9,334,059 B1 * | 5/2016 | Jones | B64D 33/02 |
| 2003/0156940 A1 | 8/2003 | Czachor et al. | |
| 2010/0290892 A1 * | 11/2010 | Schwaller | B64D 33/02 415/119 |

OTHER PUBLICATIONS

The International Search Report and Written Opinion for PCT Application No. PCT/US2014/017016, dated Dec. 12, 2014.

Kandebo, S. W.: "Pratt & Whitney Launches Geared Turbofan Engine", Aviation Week and Space Technology, McGraw-Hill Company, New York, NY, Feb. 23, 1998, vol. 148, No. 8, pp. 32-34.

* cited by examiner

ACOUSTIC TREATMENT TO MITIGATE FAN NOISE

CROSS-REFERENCE TO RELATED APPLICATION

This application claims priority to U.S. Provisional Application No. 61/769,233, filed Feb. 26, 2013.

BACKGROUND OF THE INVENTION

This application relates to the design of acoustic treatment to mitigate buzz saw noise from a gas turbine engine.

Gas turbine engines are known, and typically include a fan delivering air into a bypass duct, and into a compressor. The air in the compressor is compressed and passed into a combustion section where it is mixed with fuel and ignited. Products of this combustion pass downstream over turbine rotors, driving them to rotate. The turbine rotors in turn drive the fan and compressor rotors.

Gas turbine engines having a fan as described above are typically utilized to drive aircraft. During take-off and climb for commercial aircraft, a problem called "buzz saw noise" can be a significant contributor to noise in the passenger cabin. Buzz saw noise is produced when supersonic flow interacts with the fan. This interaction produces shocks that propagate upstream. The shocks eventually evolve into sound that is emitted from the inlet. This sound is then transmitted through the fuselage and into the cabin of the aircraft where it is perceived as a buzz saw like noise by the passengers.

Near the fan, the shocks are characterized by a wave pressure pattern. This wave is composed of tones at the blade passage frequency and its harmonics. Due to small blade-to-blade geometric variations, the spacing between neighbouring shocks ceases to be circumferentially uniform as they propagate upstream.

Ultimately, when these shocks evolve into sound, the sound is characterized by multiple tones at engine-order harmonics. Due to this characteristic, buzz saw noise may also be known as multiple pure tone noise. Buzz saw noise typically assumes its largest magnitude when the fan tip relative Mach number is approximately 1.2.

Gas turbine engines are treated with acoustic liners to attenuate fan noise. In some cases, those acoustic liners have been designed to mitigate buzz saw noise, but they have been deeper than the liners described by the present invention.

SUMMARY OF THE INVENTION

In a featured embodiment, a gas turbine engine has a propulsor including a fan. A liner is positioned radially outwardly and upstream of the fan. The liner has a backing plate. A cellular structure has cells the extend from the backing plate, and a perforated sheet facing radially inward with a depth 'd.' of the cells being defined as a distance between the perforated face sheet and the backing sheet. The depth in inches is selected to achieve a desired ratio of the depth relative to a gap $\tau$ defined by the equation:

$$\tau = \frac{\pi D}{B}$$

where B is the number of fan blades in the fan and D is a fan diameter measured in inches. A depth to gap ratio is substantially in a range of 0.035 to 0.08.

In another embodiment according to the previous embodiment, the depth to gap ratio is reached by selecting a desired reactance.

In another embodiment according to any of the previous embodiments, the desired ratio of the depth relative to the gap is selected by identifying a reactance associated with a desired level of noise attenuation.

In another embodiment according to any of the previous embodiments, the gap ratio is calculated as:

$$\frac{d}{\tau} = \frac{\tan^{-1}\left(\frac{1}{-X}\right)}{2\pi M_{tip}}$$

wherein X is the desired reactance, and $M_{tip}$ is a tip rotational mach number for a tip of the fan.

In another embodiment according to any of the previous embodiments, wherein $M_{tip}$ equals $$M_{tip} = \frac{\pi}{720c} D N_1$$

wherein $N_1$ is a fan rotational speed, and c is the local speed of sound at the fan leading edge.

In another embodiment according to any of the previous embodiments, a tip rotational Mach number for a tip of said the fan is greater than or equal to 0.8, and less than or equal to 1.2.

In another featured embodiment, a method of defining an acoustic liner for a gas turbine engine includes the steps of designing a liner to be positioned upstream of a fan in a gas turbine engine. The liner is designed to have a perforated face sheet spaced from a backing sheet by a cellular structure. The cellular structure is designed to have a plurality of cells. The cells have a depth defined by the distance between the face plate and the backing plate. The depth is selected to achieve a desired reactance for the liner to mitigate a frequency associated with buzz saw noise.

In another embodiment according to any of the previous embodiments, the depth is selected to achieve a desired ratio of the depth relative to a gap $\tau$ defined by the formula wherein the gap $\tau$ is defined by the following equation:

$$\tau = \frac{\pi D}{B}$$

where B is the number of fan blades in the fan and D is a fan diameter measured in inches.

In another embodiment according to any of the previous embodiments, the depth to gap ratio is substantially in a range of 0.035 to 0.08.

In another embodiment according to any of the previous embodiments, the depth to gap ratio is reached by selecting a desired reactance.

In another embodiment according to any of the previous embodiments, the desired ratio of the depth relative to a gap is selected by identifying a reactance associated with a desired level of noise attenuation.

In another embodiment according to any of the previous embodiments, the gap ratio is calculated as:

$$\frac{d}{\tau} = \frac{\tan^{-1}\left(\frac{1}{-X}\right)}{2\pi M_{tip}}$$

wherein X is the desired reactance, and $M_{tip}$ is a tip rotational mach number for a tip of the fan.

In another embodiment according to any of the previous embodiments, $M_{tip}$ equals $$M_{tip} = \frac{\pi}{720c}DN_1$$

wherein $N_1$ is a fan rotational speed, and c is the local speed of sound at the fan leading edge. In another embodiment according to any of the previous embodiments, a tip rotational Mach number for a tip of the fan is greater than or equal to 0.8, and less than or equal to 1.2.

These and other features of this application may be best understood from the following specification and drawings, the following which is a brief description.

DETAILED DESCRIPTION

Figure 1:
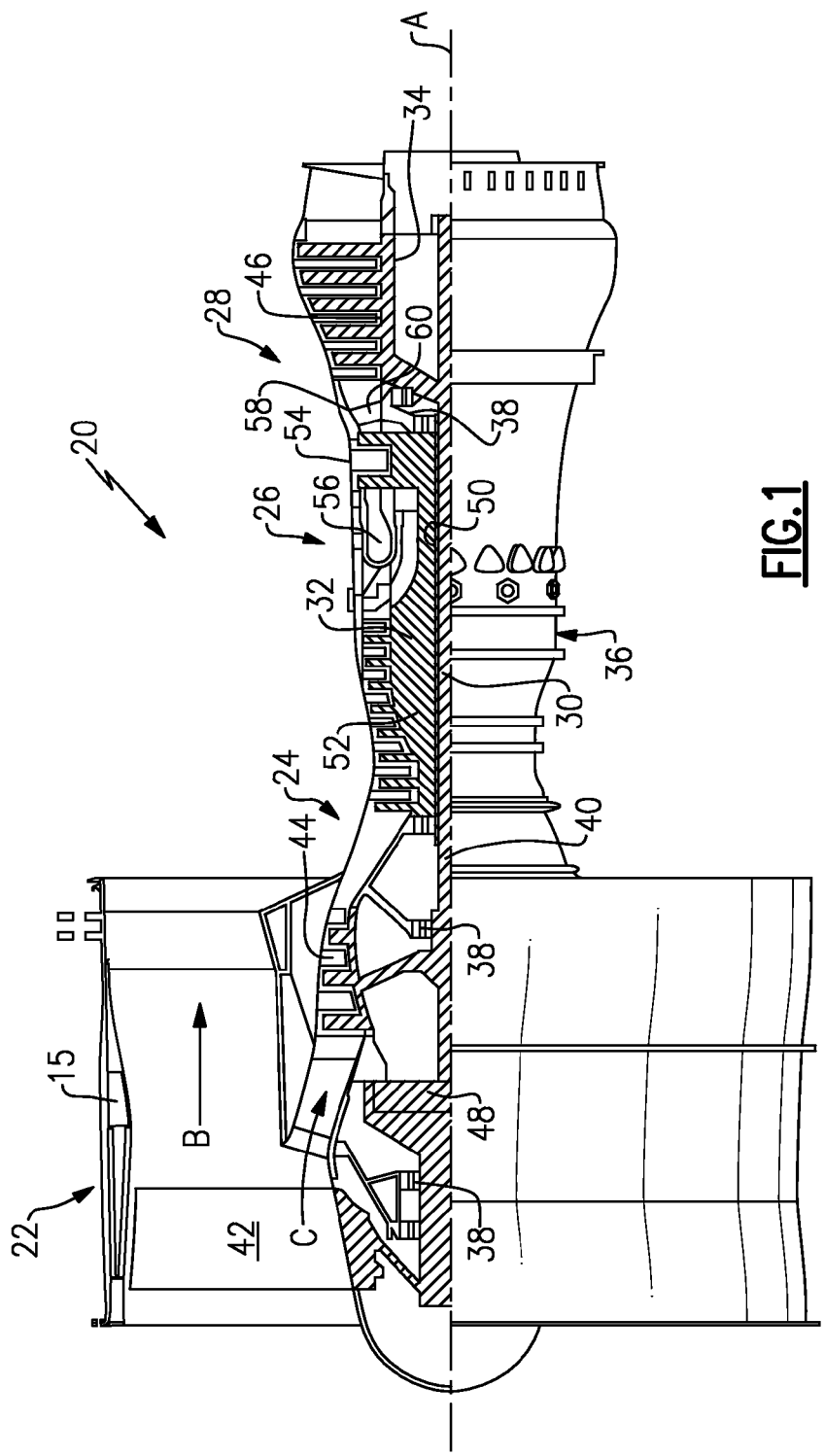
FIG. 1 shows a schematic gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about 10, the fan diameter is significantly larger than that of the low pressure compressor 44, and the low pressure turbine 46 has a pressure ratio that is greater than about 5. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7 °R)]^{0.5}$. The "Low corrected fan tip speed" as disclosed herein according to one non-limiting embodiment is less than about 1150 ft/second.

Figure 2:
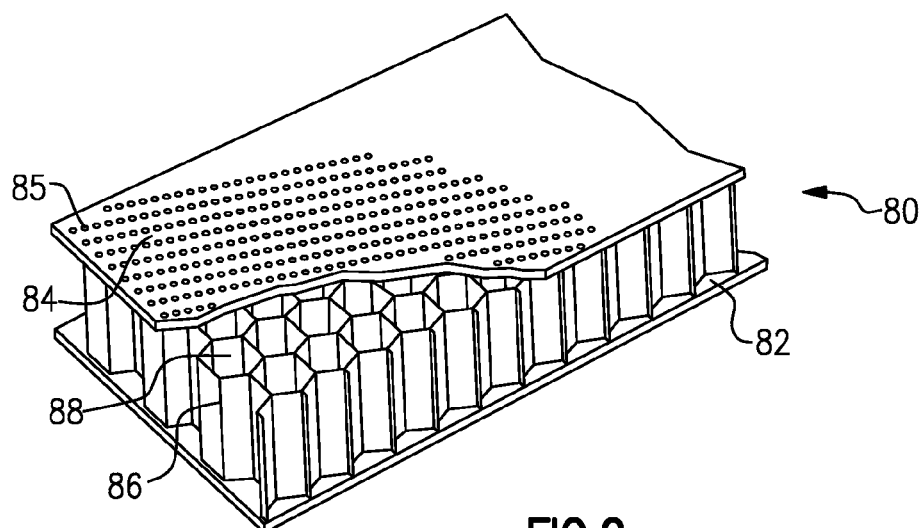
FIG. 2 shows a fan liner having acoustic treatment.

FIG. 2 shows a liner 80 which may be associated with an upstream location in the engine 20, immediately upstream of the fan rotor 42. This may be the most upstream liner in the engine. A perforated outer sheet 84 having perforations 85, is spaced from a solid backing sheet 82 by a cellular structure 86. The cellular structure 86 has a plurality of cells 88. As shown, the cellular structure 86 may be honeycombed.

Figure 3:
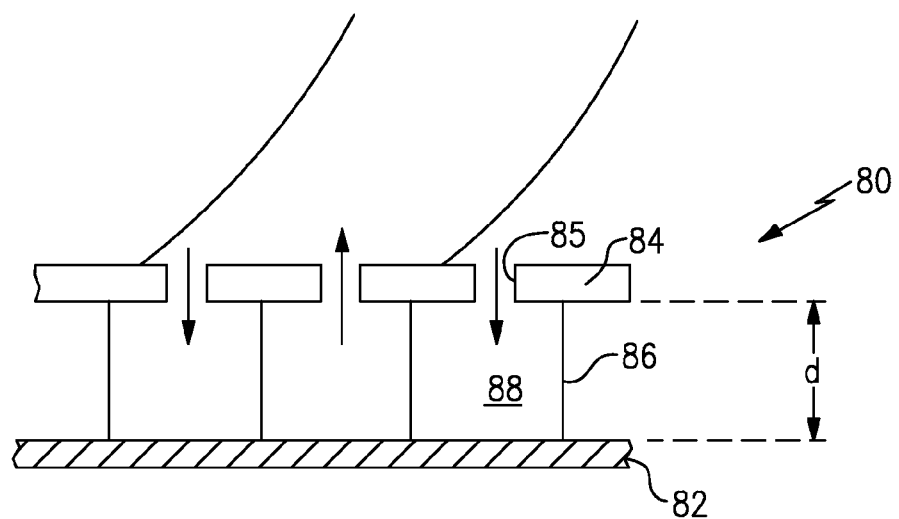
FIG. 3 is a cross-section to the FIG. 2 liner.

As shown in FIG. 3, perforations 85 in the perforated sheet 84 allow sound waves to pass into the cells 88, and toward a backing sheet 82. A depth of the cells 88 will serve to change the reaction of the liner 80, and its ability to dampen certain frequencies of sound.

Figure 4:
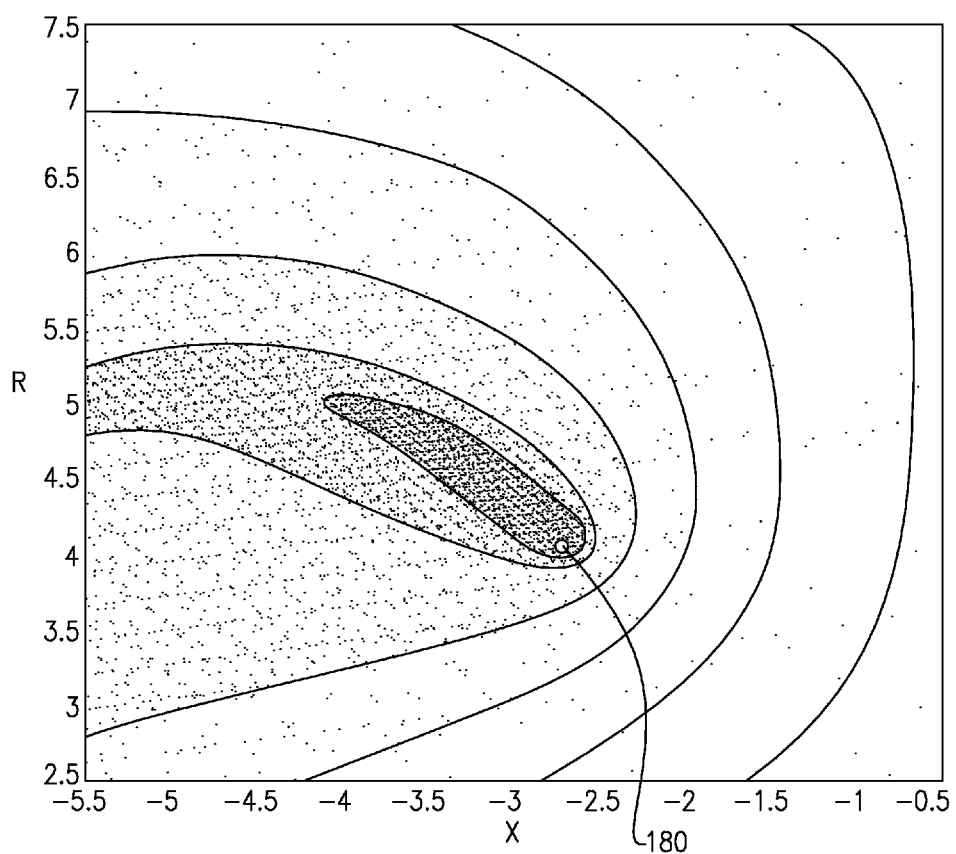
FIG. 4 shows a graph of attenuation for a liner having a reactance X and resistance R.

FIG. 4 is contour plot showing liner attenuation versus reactance X and resistance R of a liner at a targeted frequency and acoustic mode. Both the reactance and resistance have been normalized by the local specific acoustic impedance, which is the local density multiplied by the local acoustic speed. The resistance is defined as the pressure drop divided by the flow velocity across a liner, such as liner 80. The resistance is designed based on any number of features, and a worker of ordinary skill in the art would know how to control the structure of the liner 80 to achieve a desired resistance. The reactance is defined below.

Such charts have been utilized in the prior art to describe acoustic liners to mitigate a wide range of noise frequencies. Thus, reactances in the range of 0 to −1 have been selected as a design point for a frequency range.

The graph of FIG. 4 shows an area 180 which has the highest amount of attenuation. That is, the area 180 is the reactance value and the resistance value that result in the greatest amount of sound deadening for a targeted frequency and acoustic mode. In a novel aspect of the application, the FIG. 4 plot is prepared to address the frequencies that initiate buzz saw noise. That is, in the past, a wide range of frequencies was addressed, rather than the focus on buzz saw initiation frequencies.

Since the liner 80 is positioned close to the fan, it can be designed to attenuate the sound waves immediately upstream of the fan section 22. At this point, the buzz saw noise is not yet formed, and the acoustic treatment should be targeted at fan blade passing frequency and its associated acoustic modes. Attenuating the fan blade passage frequency in this manner will substantially reduce the formation of buzz saw noise.

Buzz saw noise is a particular problem in both geared and direct-drive turbofan engines over a range of Tip Relative Mach numbers from about 1 to 1.3. The Tip Relative Mach number is the ratio between the air speed and the acoustic speed at the tip of the fan leading edge. The air speed includes a component for the tip speed of the fan, and also an axial component of the flow velocity of the air moved by the fan. Typically, the Tip Relative Mach number range of 1 to 1.3 occurs when the Tip Rotational Mach number is in a range of 0.8 to 1.2. The Tip Rotational Mach number is based on the speed of the fan tip, that is, it does not include the axial component mentioned above. To target attenuation of this noise source, one should target one or perhaps two acoustic radial modes associated with the fan blade passing frequency.

Thus, one might pick a normalized reactance that is optimized to have maximum attenuation, as shown in FIG. 4, generally be between −3.5 and −2.5. Then, from the reactance, one can determine a preferential depth d for the liner 80. The reactance X can be described as the acoustic treatment reactance normalized by the local specific acoustic impedance, which is the local density multiplied by the local acoustic speed. A formula below shows how one calculates the depth with sufficient accuracy to achieve the desired reactance range:

$$X \approx -\cot\left(\frac{\omega}{c}\frac{d}{12}\right) \qquad \text{Equation 1}$$

Where:
X=reactance
ω=frequency (rad/sec)
c=acoustic speed (ft/sec)
d=depth of the liner (inches)
Since:

$$\omega = \frac{2\pi B N_1}{60} \qquad \text{Equation 2}$$

and gap τ

$$\tau = \frac{\pi D}{B} \qquad \text{Equation 3}$$

we can restate Equation 1 as:

$$X \approx -\cot\left(2\pi M_{tip}\frac{d}{\tau}\right) \qquad \text{Equation 4}$$

Where:
$N_1$=fan rotational speed (rpm)
B=number of fan blades
D=Fan diameter (inches)
and:

$$M_{tip} = \frac{\pi}{720c}DN_1 \qquad \text{Equation 5}$$

Thus, a depth-to-gap ratio for the liner can be calculated as:

$$\frac{d}{\tau} = \frac{\tan^{-1}\left(\frac{1}{-X}\right)}{2\pi M_{tip}} \qquad \text{Equation 6}$$

A range of greater than or equal to 0.035, and less than or equal to 0.08 has been found to mitigate the buzz saw noise from a turbo fan engine. This ratio is reached, in part, based upon a selection of a reactance in the desired range mentioned above for a range of tip Mach numbers between 0.8 and 1.2.

For a given blade gap, tip Mach number and desired reactance, the best liner depth is uniquely determined through equation 6. Alternatively, for a given liner depth, tip Mach number, and desired reactance, the best blade gap is uniquely determined through equation 6.

Although embodiments of this invention have been disclosed, a worker of ordinary skill in the art would recognize that certain modifications would come within the scope of this invention. For that reason, the following claims should be studied to determine the true scope and content of this invention.

The invention claimed is:

1. A gas turbine engine comprising:
a propulsor including a fan; and
a liner positioned radially outwardly and upstream of said fan, said liner having a backing sheet, a cellular structure having cells extending from said backing sheet, and a perforated outer sheet facing radially inward with a depth 'd' of said cells being defined as a distance between said perforated outer sheet, and said backing sheet;

said depth in inches is selected to achieve a desired ratio of the depth relative to a blade gap, the blade gap $\tau$ being defined by the equation:

$$\tau = \frac{\pi D}{B}$$

where B is the number of fan blades in said fan and D is a fan diameter measured in inches; and a depth to the blade gap ratio is in a range of 0.035 to 0.08.

2. The gas turbine engine as set forth in claim 1, wherein said depth to blade gap ratio is reached by selecting a desired reactance.

3. The gas turbine engine as set forth in claim 2, wherein said desired ratio of the depth relative to the blade gap is selected by identifying a reactance associated with a desired level of noise attenuation.

4. The gas turbine engine as set forth in claim 3, wherein the depth to blade gap ratio is calculated as:

$$\frac{d}{\tau} = \frac{\tan^{-1}\left(\frac{1}{-X}\right)}{2\pi M_{tip}}$$

wherein X is the desired reactance, and $M_{tip}$ is a tip rotational mach number for a tip of said fan.

5. The gas turbine engine as set forth in claim 4, wherein $M_{tip}$ equals $$M_{tip} = \frac{\pi}{720c} DN_1$$

wherein $N_1$ is a fan rotational speed, and c is the local speed of sound at the fan leading edge.

6. The gas turbine engine as set forth in claim 4, wherein the tip rotational Mach number for the tip of said fan is greater than or equal to 0.8, and less than or equal to 1.2.

* * * * *